United States Patent [19]

Schul

[11] 4,010,022
[45] Mar. 1, 1977

[54] APPARATUS FOR MAKING FUSED SILICA TUBING

[75] Inventor: Herbert Schul, Hanau am Main, Germany

[73] Assignee: Heraeus-Schott Quarzschmelze GmbH, Hanua am Main, Germany

[22] Filed: June 16, 1975

[21] Appl. No.: 587,449

[30] Foreign Application Priority Data

June 25, 1974 Germany .......................... 2430428

[52] U.S. Cl. .................................. 65/277; 65/109; 65/110; 65/87; 65/280; 65/296; 65/297
[51] Int. Cl.$^2$ .................. C03B 23/04; C03B 21/00
[58] Field of Search ............ 65/109, 110, 277, 280, 65/285, 297, 120, 81, DIG. 8, 86, 87, 296

[56] References Cited

UNITED STATES PATENTS

| | | | |
|---|---|---|---|
| 1,645,086 | 10/1927 | Berry et al. .......................... 65/109 |
| 1,653,848 | 12/1927 | Grotta .................................. 65/86 |
| 1,766,638 | 6/1930 | Howard ............................ 65/277 X |
| 1,857,791 | 5/1932 | Peiler ................................ 65/110 X |
| 2,393,979 | 2/1946 | Everett .................................. 65/277 |
| 3,229,005 | 1/1966 | Reifenhauser ...................... 65/110 X |
| 3,309,188 | 3/1967 | Porter et al. .......................... 65/109 |
| 3,449,105 | 6/1969 | Dieman et al. .................. 65/277 X |
| 3,853,522 | 12/1974 | Guenthmer ...................... 65/280 X |

*Primary Examiner*—Robert L. Lindsay, Jr.
*Assistant Examiner*—Frank W. Miga
*Attorney, Agent, or Firm*—Burgess, Dinklage & Sprung

[57] ABSTRACT

Tubes of transparent, translucent or opaque fused silica are made by heating a hollow cylindrical blank in a drawing zone, drawing the blank from the zone while maintaining its interior under pressure and rotating same about its longitudinal axis, and calibrating the still-plastic tube immediately upon leaving the drawing zone in a calibration zone defined by two graphite plates. Apparatus for carrying out the method includes means for heating the blank to a drawing temperature in a drawing zone, means for drawing the blank from the zone, means for maintaining the interior of the blank under pressure and means for rotating the blank as it is drawn, and calibrating means for calibrating the still-plastic tube immediately upon leaving the drawing zone including two graphite plate means disposed on metal plates through which a coolant can flow.

9 Claims, 1 Drawing Figure

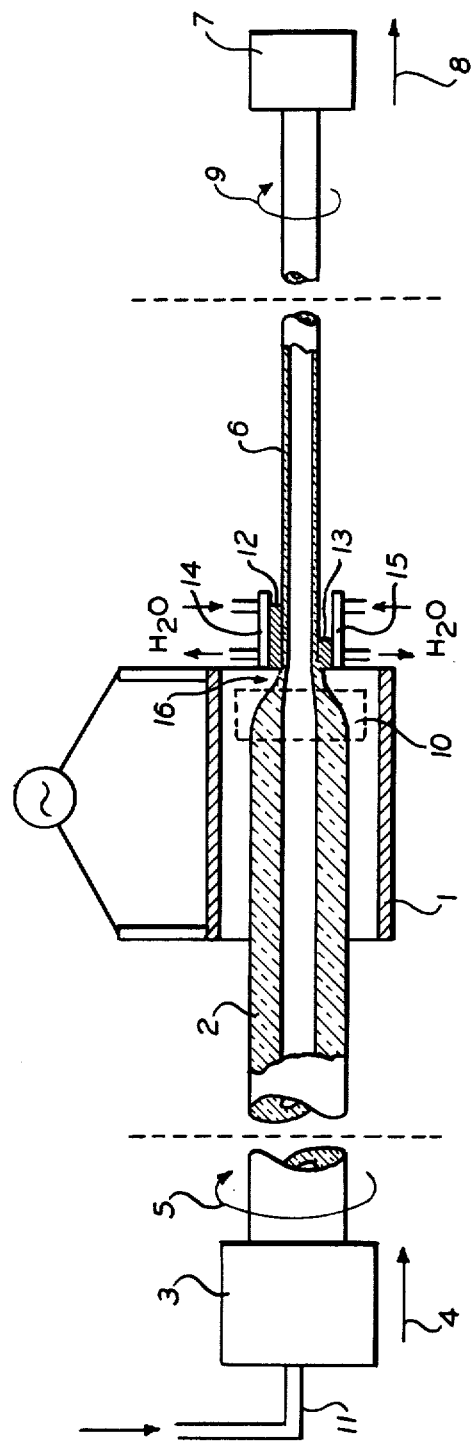

APPARATUS FOR MAKING FUSED SILICA TUBING

BACKGROUND

The invention relates to a method of manufacturing a tube of transparent, translucent or opaque fused silica to close tolerances as regards its outside diameter, in which method a plastic, tubular section of the horizontally disposed fused silica tube produced by drawing a raw material, in the form of a hollow cylinder for example, in a drawing zone and rotating it about its longitudinal axis, is blown against a graphite plate which determines the outside diameter of the tube; it relates also to an apparatus for the practice of this method.

German Pat. No. 742,008 describes a method of making, from glass tubes, glass bodies having a precisely specified diameter which varies from section to section according to specifications. The starting point is a glass tube of given length. This glass tube is heated along the section that is to be shaped, until it softens, and then it is drawn through a gauge corresponding to the diameter that is to be produced. The entire section that is to be drawn can be heated as the drawing is performed, the drawing being accomplished with the use of a burner acting on one side while the glass tube is rotated, it being desirable to rotate the gauge at the same angular speed. While the softened glass tube is being drawn through the gauge, the tube is blown against the gauge, thereby producing a precise application of the tube to the gauge. To solidify the glass tube immediately after passage through the gauge, either a cooling jet is provided, or the gauge itself is provided with cooling passages to carry a coolant.

The German Patent application B No. 17,145, published on July 9, 1953, discloses a method of making moldings of comparatively large cross section from fused silica. In this case, crystalline silica is continuously fed through a passage having a melting zone, and is fused to form a strand having the same cross-sectional area as the profile that is to be produced. After leaving the passage, the strand is severed into appropriate segments. The raw material and the melt can be transported through a horizontally disposed passage. By this method, any desired solid or hollow profile can be made. In the final section of the passage, as long as the material is still sufficiently plastic, it can be shaped by an action similar to that of the die of an extruding machine. The strand leaving the passage, if it is still in the plastic state, can also be subjected to additional forming, for example by rolling, pressing or the like.

Lastly, it is also known to calibrate fused silica tubes by mounting cut lengths of tubing in a redrawing machine, heating them zone-wise until they become plastic, and, while rotating them about their longitudinal axis, blowing them against a graphite plate whose distance from the longitudinal axis of the tube corresponds to one-half of the specified outside diameter.

THE INVENTION

The invention is addressed to the problem of simplifying the production of tubes from transparent, translucent or opaque fused silica to extremely small tolerances with regard to their outside diameter.

This problem is solved, for a process of the kind described in the beginning, by inflating every still-plastic portion, immediately upon its emergence from the drawing zone, against at least two confronting graphite plates disposed at a distance corresponding to the specified outside diameter of the tube, and then cutting the tube to length. It has been found advantageous to blow each portion of tubing, before it passes the graphite plates, to a diameter that is greater than the specified outside diameter of the tubing. To achieve the quickest possible cooling of the quartz to the solid state, the graphite plates are best cooled while the tube is being calibrated by them. This also has the advantage that no traces of graphite are deposited on the outside surface of the tube to become disadvantageously evident in the later use of the tube. Only by limiting the still plastic section of the tube by means of graphite plates and inflating it immediately after the drawing is it possible to produce tubes of precise outside diameter. The diameter variations in the drawing process without graphite plates are very appreciable, and they necessitate redrawing in separate drawing machines, which is very time consuming and expensive.

Each portion of tubing is passed between the graphite plates making tangent contact therewith, thereby preventing the cooling, revolving tube from sticking to them.

The method of the invention has the advantage that the calibration directly follows the drawing process, and only then is the calibrated tube cut to the desired length. Additional heating to the plastic state, such as is required in known methods for the calibration of tubes already cut to length, is eliminated in the method of the invention, which is thus distinguished by an energy saving. Additional procedures, such as the mounting of tubes that have already been cut to length, are eliminated. By the method of the invention, outside diameter tolerances of 0.2 to 0.3 mm can easily be achieved, even for tube lengths in excess of 20 m. The use of flat graphite plates as calibrating tools does not result in high tool costs disadvantageous to the process. The graphite plates can be set at any desired distance apart, even while the tube is being drawn, so that calibration for different outside diameters of tubes can be performed at any time without great difficulty.

The drawing presents a top plan view, partially in cross section, of an apparatus for the practice of the method of the invention which will be explained with reference thereto.

The reference number 1 is associated with a heating tube which is supplied with electrical power. Into this tube a horizontally disposed hollow cylinder 2 of fused silica is fed continuously, as indicated by the arrow 4, by means of a feeding system 3 represented in block form. The feeding system additionally contains an apparatus for rotating the hollow cylinder 2 during its advancement into the heating tube, this rotation being indicated by the arrow 5. In the heating tube the continuously fed fused silica is heated to such a high temperature that it can be drawn into a tube 6. The drawing is performed in a drawing apparatus 7 indicated in block form, which draws the tube 6 in the direction of the arrow 8. The drawing apparatus 7 contains, like the feeding system, a system for rotating tube 6 during the drawing process as indicated by the arrow 9. Reference number 10 relates to the drawing zone indicated in broken lines, which is the zone in which the hollow cylinder 2 is drawn to form the tube 6. During the drawing process, an inert gaseous medium such as forming gas is delivered through line 11 for the purpose of maintaining an overpressure in the interior of the hollow cylinder and the tube.

Each still plastic tube portion leaving the drawing zone 10 indicated in broken lines is carried immediately thereafter between the two confronting graphite plates 12 and 13. Each graphite plate is mounted on a metal plate 14 and 15, respectively, through which a coolant such as water flows during the calibration. The overpressure mentioned above is selected such that, on the one hand the outside diameter of each portion of the tube drawn from the hollow cylinder 2 will be larger before passing the graphite plates, as indicated at 16, than the prescribed outside diameter of the tube 6 after passing the graphite plates, and on the other hand the tube will be urged from within against the graphite plates. The graphite plates 12 and 13 are flattened on the side facing the fused silica tube, so that each tube portion will pass between these plates with tangent contact during the calibration. The graphite plates are spaced apart by a distance corresponding to the prescribed outside diameter of the tube 6. As the drawing indicates, one of the graphite plates—plate 12, for example, is longer, as seen in the drawing direction (arrow 8) than graphite plate 13. This greater length of the graphite plate 12 has the advantage that the axis of tube 6 is thus established in the vertical plane. The tube axis is also established in the horizontal plane by rotation about its own axis and the horizontal pulling force. In this manner, straight tubes are obtained. Even inhomogeneities in the raw material will be unable to affect the shaping of the tube axis and the maintenance of the outside diameter.

What is claimed is:

1. An apparatus for making fused silica tubes from a hollow cylindrical tube of fused silica which comprises a heating zone, means for supplying heat to said heating zone, means for continuously feeding said hollow cylindrical tube to said heating zone, means for rotating said hollow cylindrical tube as it is fed to said heating zone, means downstream of said heating zone for continuously withdrawing said tube from said heating zone, means for rotating the same about its own longitudinal axis as it is withdrawn from said heating zone, means for applying pressure to the interior of said tube while it is being withdrawn from said heating zone and rotated, and calibrating means downstream of said heating zone for calibrating the still-plastic tube immediately upon leaving the heating zone, said calibrating means being disposed adjacent to said heating zone, said calibrating means comprising at least two tube confronting flat graphite plate means disposed upon a support and at a distance from one another corresponding to the desired outside diameter of said tube, said support means including a conduit therein and means for passing a coolant through said conduit.

2. Apparatus of claim 1 wherein the graphite plate means are flat on the side facing the fused silica tube.

3. Apparatus of claim 1 wherein one graphite plate means is longer in the longitudinal direction than the graphite plate means disposed opposite thereof.

4. Apparatus of claim 1 wherein the graphite plate means are adjustable in their spacing from one another.

5. An apparatus according to claim 1 wherein the said support means is a metal plate means.

6. An apparatus according to claim 1 additionally comprising means for varying the distance between said tube confronting graphite plates.

7. An apparatus according to claim 1 wherein said graphite plate means are opposed to one another.

8. An apparatus according to claim 7 wherein said graphite plate means lie longitudinally along the path of withdrawal of said heated tube from said heating zone.

9. An apparatus according to claim 1 wherein there are a plurality of means for rotating said hollow cylindrical tube, one of which is upstream of said heating zone and another which is downstream of said heating zone.

* * * * *